United States Patent [19]
Tjaden

[11] 3,821,910
[45] July 2, 1974

[54] GLASS CUTTING MECHANISM
[75] Inventor: James S. Tjaden, South Bend, Ind.
[73] Assignee: South Bend Controls Inc., South Bend, Ind.
[22] Filed: Aug. 8, 1972
[21] Appl. No.: 278,788

[52] U.S. Cl.............................. 83/8, 83/12, 83/577
[51] Int. Cl............................................. C03b 33/02
[58] Field of Search............... 83/8, 12, 6, 577, 575; 225/96, 96.5

[56] References Cited
UNITED STATES PATENTS
1,128,036  2/1915  Paulero.......................... 83/577 UX
3,276,302  10/1966  Insolio...................... 83/8
3,399,586  9/1968  Insolio et al............................ 83/8
3,518,907  7/1970  Pinel........................ 83/12

Primary Examiner—Frank T. Yost
Attorney, Agent, or Firm—Hobbs & Green

[57] ABSTRACT

A mechanism for cutting glass sheet in which a solenoid operates a scoring tool which is urged with a substantially constant force into engagement with the surface of the glass, regardless of variations in glass thickness or irregularities in the surface. The armature in the solenoid is provided with tapered ends which engage end plates having recesses corresponding to the tapered ends of the armature, and a means, preferably a second coil, is used to retract the cutting tool when the first solenoid is de-energized.

11 Claims, 3 Drawing Figures

GLASS CUTTING MECHANISM

In the manufacture of flat glass, such as plate glass and window glass, large sheets are cut into sections of the desired size by a continuous or semi-continuous operation in which the cooled glass sheets are scored with a cutting tool and the sections severed by breaking the sheets along the scored line. The scoring tool usually consists of a wheel or roller which is normally mounted on a bracket, fixture or track in such a manner that it can move rapidly across the sheet or plate material or in such a position that the sheet or plate material will be scored by the tool as the material moves through the cutting machine. In the past, the scoring tools used on the cutting machines have mostly been hydraulically or mechanically actuated, and because of the relatively slow response of these types of mechanisms to operating conditions and glass surface irregularities, the score lines were occasionally nonuniform, and hence the break of the glass along the score line would be irregular and/or unpredictable, often resulting in scrap. It is therefore one of the principal objects of the present invention to provide a mechanism for operating a tool for cutting glass, such as sheet and plate glass, which is readily responsive to irregularities in the surface of the glass and operating conditions, such that a uniform score line is easily produced on the surface of the glass where the break is to be made, and which is so constructed and designed that it can easily be adapted to cutting machines to perform either transverse or longitudinal scoring operations.

Another object of the invention is to provide an electrically operated mechanism for controlling the scoring tool of a machine for cutting sheet and plate glass into sections, which is compact in construction and can be easily installed and serviced, and which can be easily adjusted and effectively controlled to give optimum performance over extended periods of operating time.

Still another object is to provide a relatively simple, highly responsive glass cutting mechanism which will produce precise scoring with the cutting tool urged against the glass at a constant pressure under all operating conditions, and which can be substituted for the more conventional mechanical and hydraulic scoring and cutting mechanisms.

Further objects and advantages of the invention will become apparent from the following description and accompanying drawings, wherein.

Figure 1:
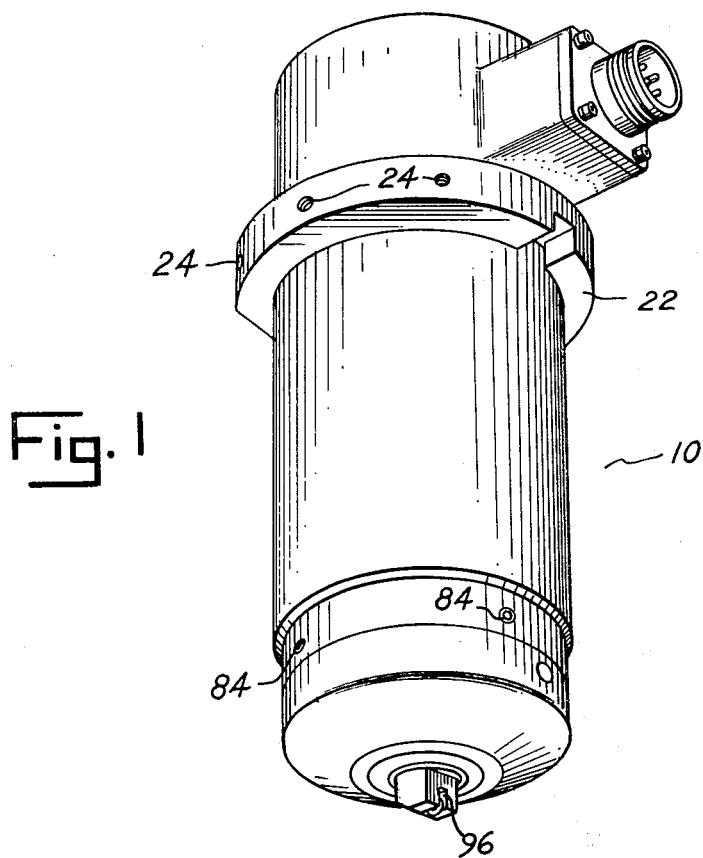
FIG. 1 is a perspective view of the principal part of the glass cutting mechanism embodying the present invention.
Figure 2:
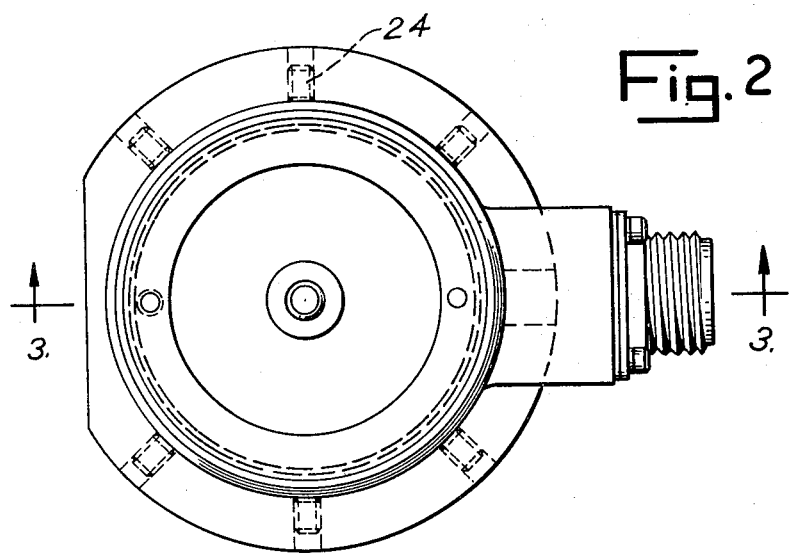
FIG. 2 is a top plan view of the mechanism illustrated in FIG. 1.
Figure 3:
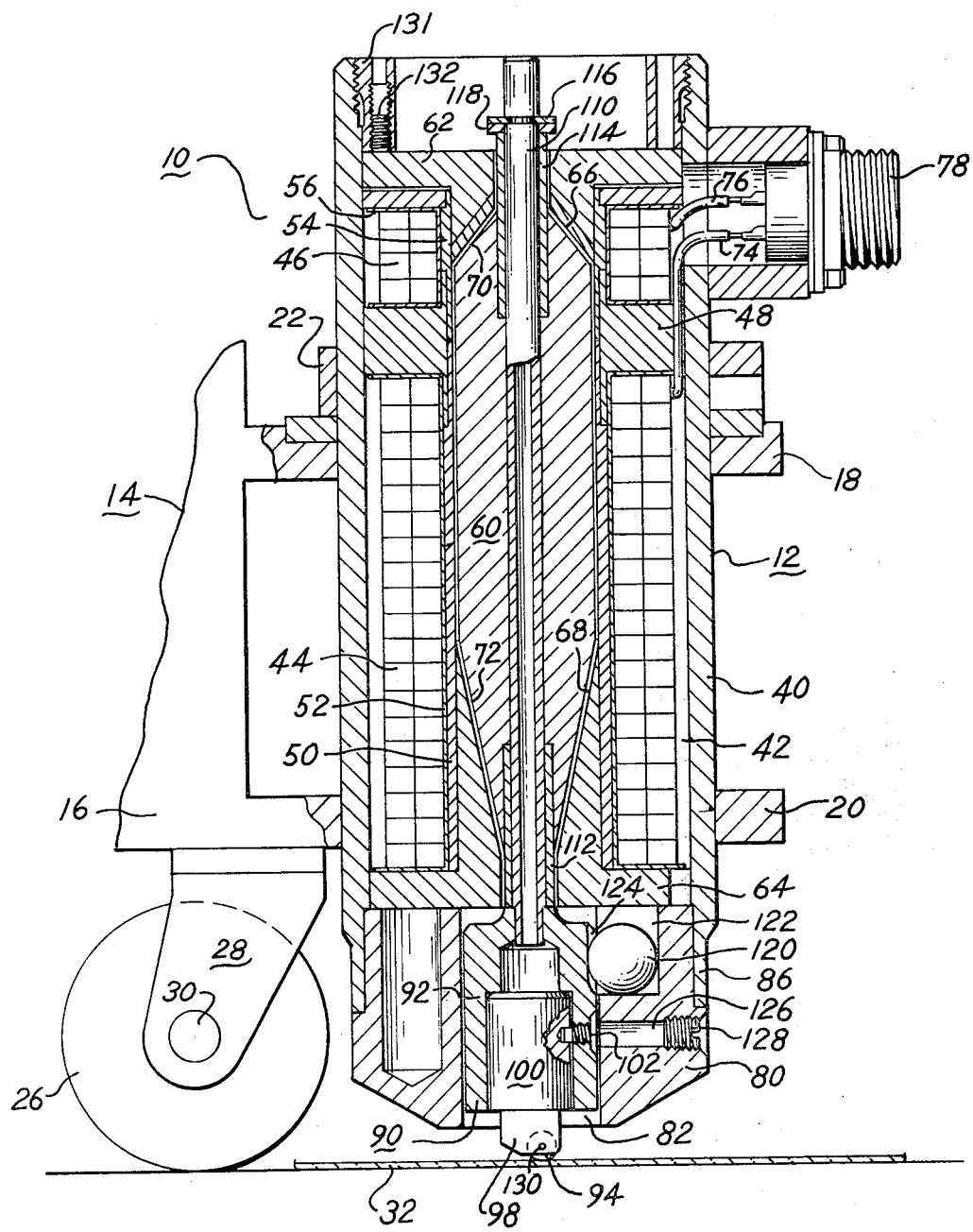
FIG. 3 is a vertical cross-sectional view of the glass cutting mechanism illustrated in FIGS. 1 and 2, the section being taken on line 3—3 of FIG. 2, showing the mechanism mounted in a carrier.

Referring more specifically to the drawings, numeral 10 indicates generally the glass cutting mechine, the cutting mechanism being indicated by numeral 12 and a carrier for the cutting mechanism being indicated by numeral 14. The carrier consists of an arm 16 having fixtures 18 and 20 with holes therethrough for receiving the cylindrically shaped cutting mechanism 12, the mechanism being held in operating position in the hole in the two arms by an adjustable ring 22 having a plurality of set screws disposed in holes 24. The arm 16 is supported by a roller 26 connected to the bottom of the arm by a fork 28 and axle 30. The roller rolls on the glass sheet or plate indicated generally by numeral 32 which may be of various thicknesses. The size and shape of the cutting mechanism may be varied to satisfy requirements, and the sheet may be supported on a flatbed or it may be supported by air jets during the cutting operation. The machine on which the present cutting mechanism is used is considered conventional for the purpose of the present description, and hence will not be described in further detail herein.

The glass cutting mechanism has a cylindrically shaped metal housing 40 having a hollow interior 42 in which are disposed coils 44 and 46, the two coils being separated from one another by an annular member 48. Coil 44 is wound on a sleeve or spool 50 and therethrough therefrom by insulation layer 52, while coil 46 is wound on sleeve 54 and insulated therefrom by insulating supported layer 56. An armature 60 is disposed within the two coils 44 and 46 and is movable from an upper plate 62 to a lower plate 64, the two plates being held rigidly in place in housing 40 and each having conical inner surfaces 66 and 68, respectively, against which the upper and lower conical ends 70 and 72 of the armature seat. The two coils 44 and 46 are connected to a source of electrical power by wires 74 and 76, respectively, extending through connector 78 near the upper end of housing 40. While solenoid 46 is energized, solenoid 44 is de-energized and the armature is seated on the conical surface of plate 62.

A cylindrically shaped body 80 having a center bore 82 is mounted on the lower end of housing 40 and secured thereto by a series of set screws 84 extending through lower flange 86 of the housing, the body being held rigidly in place at the lower end of the housing. Disposed in bore 82 of body 80 is a quill assembly indicated generally by the numeral 90 and consisting of a cylindrical member 92 adapted to reciprocate in bore 82 and support and operate a glass cutting tool such as a scoring roller or wheel 94 in slot 96 in extension 98. The extension is connected to and forms a part of retainer 100 which is held in place in a cylindrical cavity in member 92 by set screw 102 extending through the side wall thereof and engaging the external wall of the retainer.

The quill assembly 90 is connected to armature 60 by a stem 110 attached at its lower end to the upper end of member 92 and extending from one end of the armature to the other through a center bore in the armature, and projecting outwardly through the upper end of plate 62. The stem is rigidly connected to member 92 and is removably connected to the armature by sleeves 112 and 114 butting against the lower and upper ends of the armature. The stem assembly is rigidly held in place in the armature by retaining washer 116 seated on a second washer 118 which in turn seats on the upper end of sleeve 114. Since the lower end of the stem is rigidly secured in a bore in the upper end of member 92, the quill assembly and stem form a unitary structure which moves longitudinally with the armature and is held in proper operating position by a ball 120 seated in a slot 122 in body 80 and in groove 124 in the side of member 92. The ball permits longitudinal movement of the quill assembly while preventing rotational movement thereof. In order to permit retainer 100 to be conveniently installed in and removed from member 92 in assembling and servicing roller 94, a hole 126 provides an entrance to reach screw 102, hole 126 being closed when not being used by a headless screw 128. Since the scoring roller 94 is conventional and the manner in which it is used is conventional, details thereof will not be described further herein except to mention that it rolls freely on a pin 130 in extension 98. The entire coil assembly, including plates 62 and 64, is retained in the housing by a threaded ring 131 and set screw 132.

Armature 60 and plates 62 and 64 are ferrous metal, and when coil 44 is energized, the magnetic flux passes from the coil through plate 64 through the armature to annular member 48 and thence to the coil, thus completing the magnetic circuit which constantly urges the quill assembly downwardly with a uniform force. When coil 46 is energized, the magnetic flux passes through plate 62, the upper end of armature 60 and annular member 48 into the coil, thus completing the magnetic circuit for coil 46 which retracts the quill assembly.

In the operation of the glass cutting mechanism with it mounted on carrier 14 and placed on a glass sheet 32, initially the cutting roller 94 is held in spaced relation to the surface of the sheet by the energizing of coil 46 which retracts the armature upwardly, thereby elevating stem 110, quill assembly 90 and roller 94. When a scoring and cutting operation is to be performed, coil 44 is energized and coil 46 is de-energized, thus moving armature 60, quill assembly 90 and stem 110 downwardly and urging roller 94 onto the surface of the glass sheet with a constant force. The force exerted on the armature, quill assembly and roller is constant regardless of irregularities in the surface of the glass sheet, so that a uniform score line is obtained for cutting or breaking the glass on the line. Normally the armature does not seat firmly on the conical surface of plate 64, since the full travel of the armature is prevented by the seating of roller 94 on the surface of the glass sheet. With the roller being urged firmly onto the surface of the glass sheet by the magnetic force, either the glass cutting mechanism or the glass sheet is moved, thus causing the roller to roll along the surface producing the desired score line. After the scoring operation has been completed, the scoring roller 94 is again moved to its retracted position by the energization of coil 46 and the de-energization of coil 44, thus raising armature 60, quill assembly 90 and the roller.

One of the advantages of the present glass cutting mechanism is the rapid response of the mechanism to variations in the surface of the glass, provided by the constant force of armature 60 urging the quill assembly downwardly and the roller against the glass. Any variation immediately produces a movement in the quill assembly under the force of the armature while coil 44 is energized. Further, the scoring roller can rapidly be placed in scoring position and removed from such position by the energization of coils 44 or 46 to lower and raise the roller. Since the mechanism is electrically operated, it can be readily installed without the use of heavy lines such as those used in hydraulically operated cutting mechanisms.

Still another advantage of this glass cutting mechanism is that by varying the current to coil 44 the degree or level of constant pressure applied to the surface of the glass sheet by tool 94 can be adjusted to any particular operational requirement. For example, thicker sheets of glass may require a greater force applied by tool 94 than thinner sheets; consequently, more current will be supplied to coil 44 when the mechanism is working on thicker sheets of glass than on thinner sheets. The selected degree or level of force applied, however, is maintained constant throughout the operation regardless of slight and unintentional variations in glass thickness and surface irregularities.

While only one embodiment of the present glass cutting mechanism has been described in detail herein, various changes and modifications may be made without departing from the scope of the invention.

I claim:

1. A mechanism for cutting glass sheet, comprising a retainer means for holding a glass cutting tool in operative position, a means for reciprocally holding said tool retainer means for movement of the tool to and from engagement with a sheet of glass, an armature for moving said tool retainer toward and away from a sheet of glass, upper and lower end plates between which said armature moves, an electrical coil around said armature for urging said tool into engagement with the surface of the glass sheet, means for adjusting said tool to a position above the surface of the glass where said armature remains in spaced relation to said lower end plate during the operation of the mechanism and applies a substantially constant force regardless of variations in the sheet thickness or irregularities in the glass surface, and a means for retracting said armature, retainer means and tool when said coil is de-energized.

2. A mechanism for cutting glass sheet as defined in claim 1 in which said means for retracting said armature consists of a second electrical coil operable when said first electrical coil is de-energized.

3. A mechanism for cutting glass sheet as defined in claim 1 in which said means for reciprocally holding said tool retainer means includes a cylindrical member and a body having a cylindrical hole therein surrounding said member.

4. A mechanism for cutting glass sheet as defined in claim 3 in which a housing surrounds said coil and said body is attached to one end of said housing.

5. A mechanism for cutting glass sheet as defined in claim 1 in which said armature is of a general cylindrical shape and is tapered at each end, and a plate is provided at each end thereof having a recess of substantially the same shape as the adjacent tapered end of the armature.

6. A mechanism for cutting glass sheet as defined in claim 2 in which said armature is of a general cylindrical shape and is tapered at each end, and a plate is provided at each end having a recess of substantially the same shape as the adjacent tapered end of the armature.

7. A mechanism for cutting glass sheet as defined in claim 4 in which said armature is of a general cylindrical shape and is tapered at each end, and a plate is provided at each end having a recess of substantially the same shape as the adjacent tapered end of the armature.

8. A mechanism for cutting glass sheet as defined in claim 7 in which said means for retracting said armature consists of a second electrical coil operable when said first electrical coil is de-energized.

9. A mechanism for cutting glass sheet as defined in claim 3 in which a stem is connected to the inner end of said cylindrical member, and extends through an axial opening in said armature.

10. A mechanism for cutting glass sheet as defined in claim 4 in which said housing is of a general cylindrical shape and the means is provided externally thereof for securing said mechanism to a carrier.

11. A mechanism for cutting glass sheet as defined in claim 10 in which a means is provided for preventing relative rotation of said cylindrical member in said body with respect to said body and housing.

* * * * *